United States Patent
Farkas et al.

(10) Patent No.: US 9,860,913 B2
(45) Date of Patent: *Jan. 2, 2018

(54) REDUCTION OF FALSE ALARMS IN PDCCH DETECTION

(71) Applicant: Collision Communications, Inc., Peterborough, NH (US)

(72) Inventors: Joseph Farkas, Merrimack, NH (US); Seyedmehdi S. Nokhodberiz, Nashua, NH (US); Brandon Hombs, Merrimack, NH (US)

(73) Assignee: COLLISION COMMUNICATIONS, INC., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,566

(22) Filed: Dec. 19, 2016

(65) Prior Publication Data
US 2017/0099677 A1    Apr. 6, 2017

Related U.S. Application Data

(63) Continuation of application No. 14/465,357, filed on Aug. 21, 2014, now Pat. No. 9,544,915.

(51) Int. Cl.
*H04W 72/12* (2009.01)
*H04W 24/08* (2009.01)

(52) U.S. Cl.
CPC ... *H04W 72/1294* (2013.01); *H04W 72/1257* (2013.01); *H04W 72/1278* (2013.01); *H04W 24/08* (2013.01)

(58) Field of Classification Search
CPC ... H04W 24/06; H04W 24/08; H04W 72/042; H04W 72/1257; H04W 72/1278; H04W 72/1289; H04W 72/1294; H04W 72/14; H04W 76/02
See application file for complete search history.

(56) References Cited

U.S. PATENT DOCUMENTS

| | | | |
|---|---|---|---|
| 2010/0248765 A1* | 9/2010 | Chun | H04W 72/042 455/509 |
| 2013/0155872 A1* | 6/2013 | Subramanian | H04W 24/06 370/242 |
| 2015/0009905 A1* | 1/2015 | Barbieri | H04W 72/042 370/329 |

* cited by examiner

*Primary Examiner* — Khoa Huynh (57) ABSTRACT

Methods and systems for determining scheduling information of a base station in a network operating according to the Long Term Evolution ("LTE") standard include monitoring transmissions on the PDCCH of the wireless base station, maintaining a list of active Radio Network Temporary Identifiers ("RNTI's") assigned by the wireless base station to user equipment, extracting PDCCH detections from the monitored transmissions, applying at least one false alarm reduction strategy to eliminate invalid PDCCH detections from the extracted PDCCH detections, said false alarm reduction strategy including determining an RNTI that is valid for an extracted PDCCH detection and determining if the valid RNTI is included in the list of active RNTI's. Scheduling information of the wireless base station is determined from the extracted PDCCH detection.

31 Claims, 7 Drawing Sheets

Fig. 1

Prior Art

REDUCTION OF FALSE ALARMS IN PDCCH DETECTION

RELATED APPLICATIONS

This application is a continuation of U.S. patent application Ser. No. 14/465,357, titled "REDUCTION OF FALSE ALARMS IN PDCCH DETECTIONS," filed on Aug. 21, 2014, the entire disclosure of which is here incorporated by reference.

BACKGROUND

Figure 1:
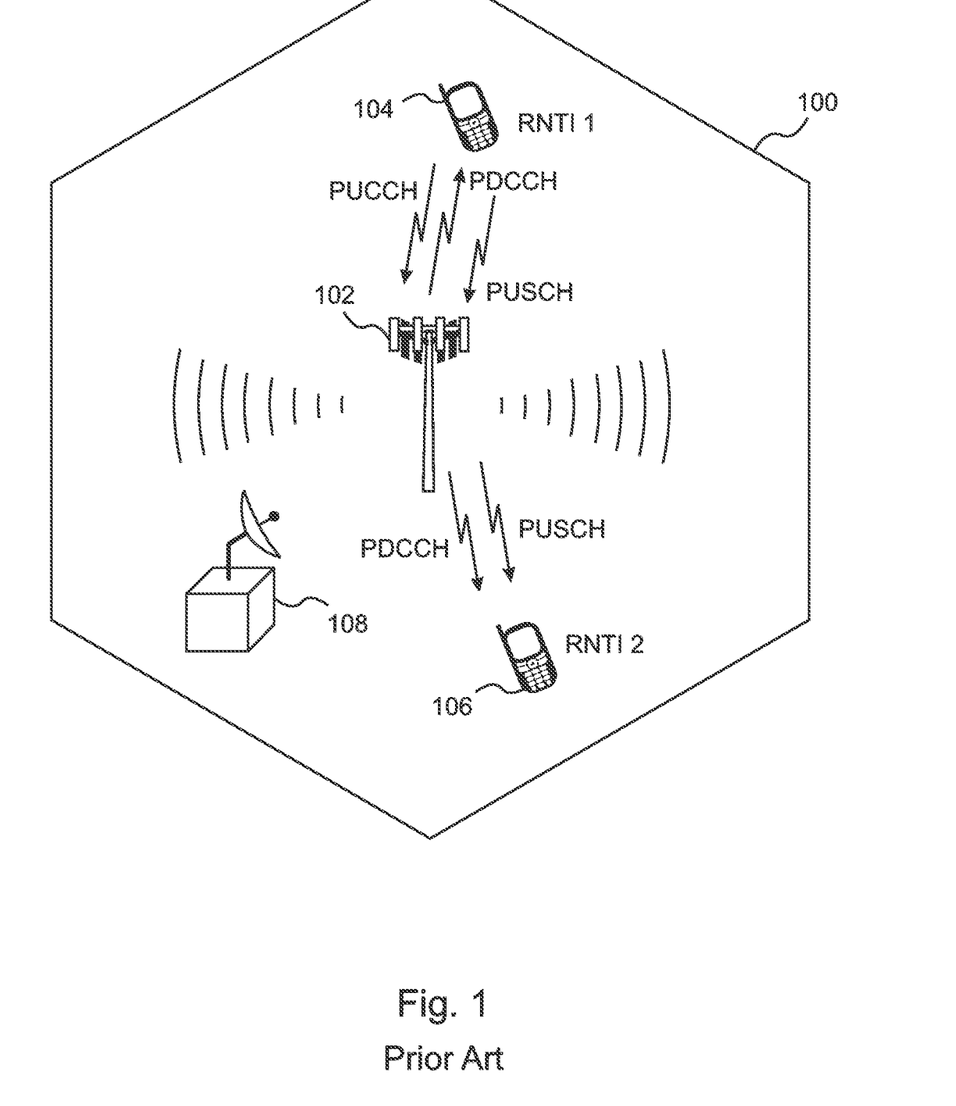
FIG. 1 is a simplified diagram showing a communication cell of the prior art.

With reference to FIG. 1, cellular networks typically include a plurality of adjacent cells 100, each of which is managed by a centralized scheduling and communication device 102, commonly referred to as a base station ("BS"), which communicates with subscribers 104, 106 that are located within the cell 100 and connected to the BS 102. The subscribers 104, 106 are commonly referred to as user equipment ("UE").

Figure 2A:
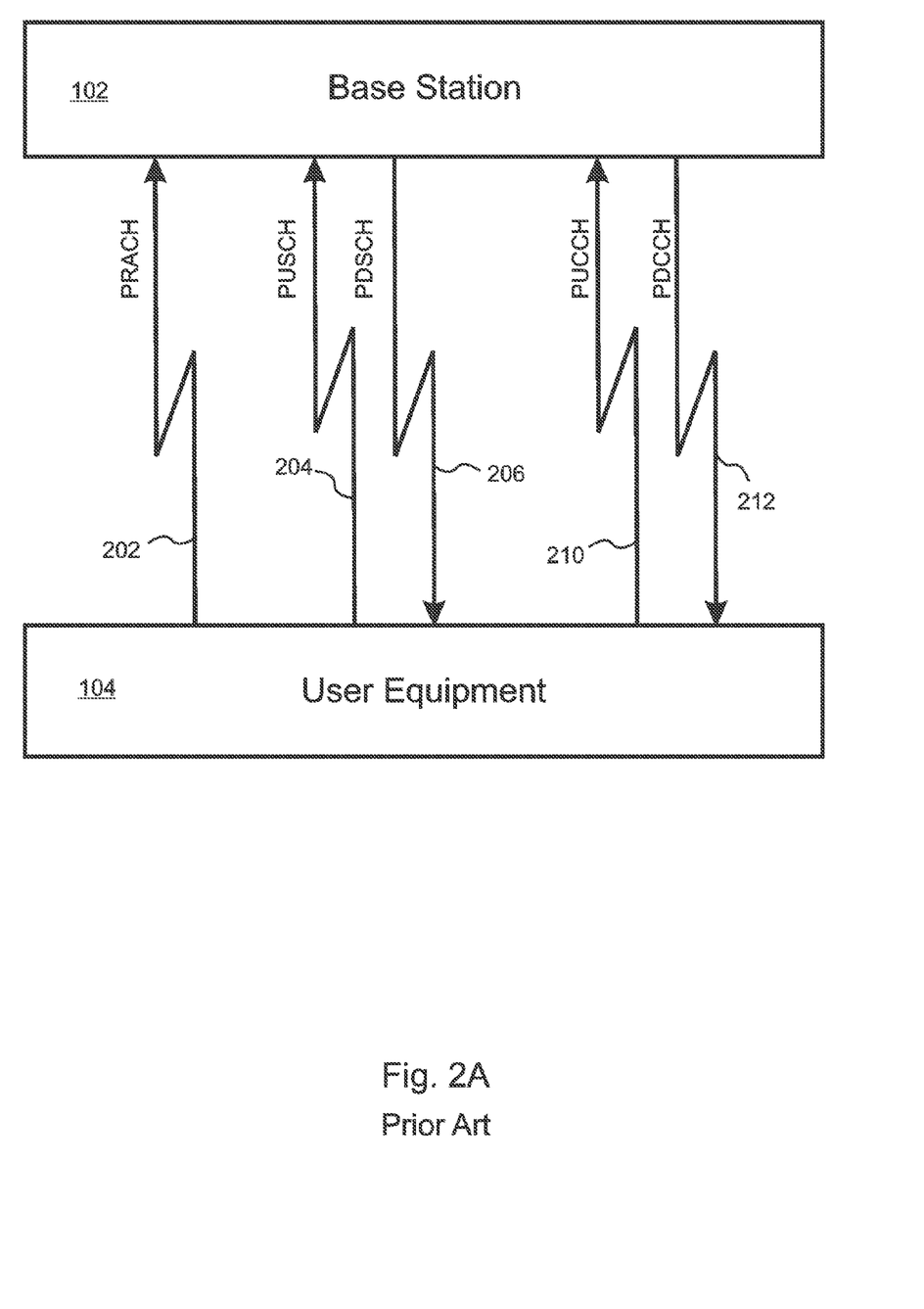
FIG. 2A is a block diagram illustrating physical channels used for communication between a UE and the base station during acquisition and during data exchange.

With reference to FIG. 2A, communication between the BS 102 and the UE's 104, 106 is tightly controlled by the BS 102. According to the Long Term Evolution ("LTE") protocol, messages are exchanged between the base station 102 and the UE's 104 through a plurality of "physical channels" 202, 204, 206, 210, 212. In particular, the base station 102 transmits both downlink scheduling and uplink scheduling to the UE's 104, 106 through the Physical Downlink Control CHannel ("PDCCH") 212. The downlink scheduling information contains the information for the UE 104 to understand and decode messages from the base station, while the uplink scheduling information contains the information that is used by the UE 104 to transmit its own messages to the base station.

If the base station transmits downlink information to a UE, it transmits downlink scheduling information on the PDCCH 212 and sends the actual downlink information on the PDSCH 206. If a UE 104 wishes to send uplink information to the BS 102, it first sends a request for authorization to the BS 102 through the Physical Uplink Control CHannel ("PUCCH") 210, and the BS 102 responds with an uplink scheduling grant through the PDCCH 212. The data is then sent to the base station in the PUSCH 204 using parameters specified by the scheduling grant information.

Figure 2B:
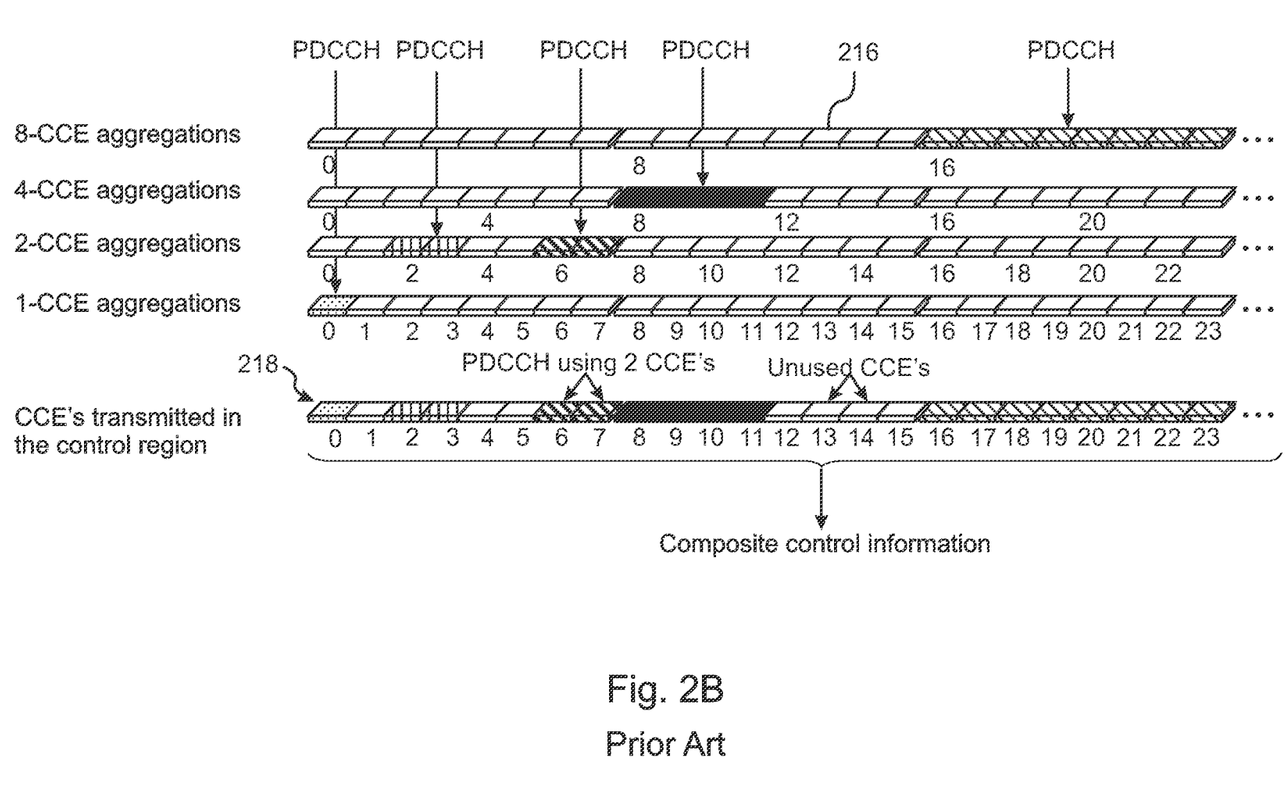
FIG. 2B illustrates the use of different numbers of CCE's in PDCCH transmissions, and the multiplexing thereof according to the prior art.

Of course, this means that all of the active UE's 104, 106 in the cell 100 must monitor the PDCCH 212 at all times. With reference to FIG. 2B, a PDCCH transmission 218 will generally contain PDCCH messages for a plurality of UE's. The BS multiplexes the PDCCH messages for the various UEs across the available bandwidth as shown in FIG. 2B. The smallest relevant section of the bandwidth is known as a Control Channel Elements (CCE) 216. Each CCE 216 consists of 36 subcarriers. A single PDCCH message can include 1, 2, 4 or 8 CCEs 216 to account for different amounts of information included in the messages. PDCCH messages cannot overlap in frequency, but must be multiplexed in frequency as shown in FIG. 2B.

Figure 2C:
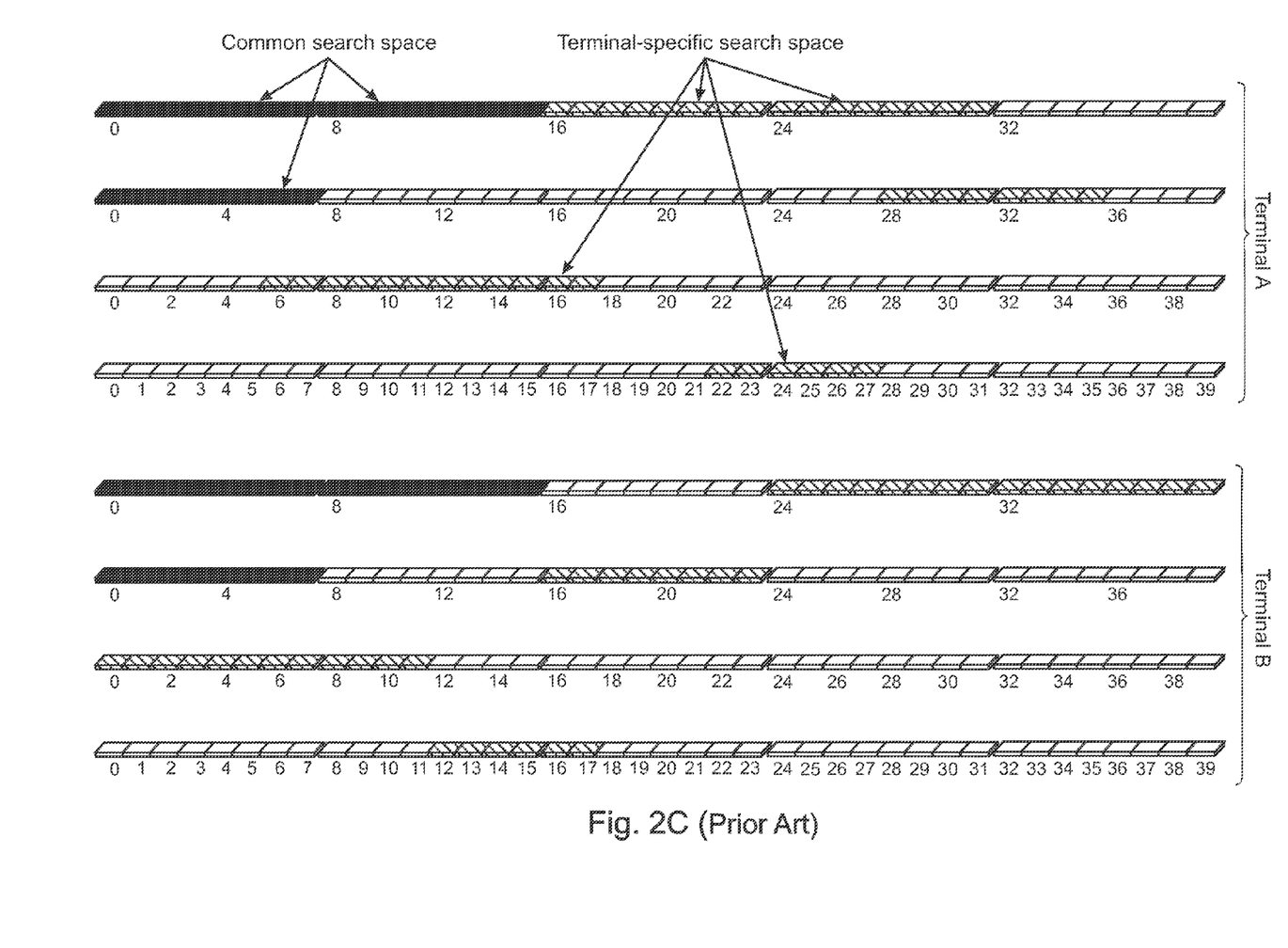
FIG. 2C illustrates the assignment by the BS of UE-specific search spaces for the PDCCH transmissions, in addition to "common" search spaces.

Each UE must therefore consider a plurality of different combinations of CCE's 216 in each PDCCH transmission 218 to determine if it is the intended recipient for any of the messages. As illustrated in FIG. 2C, this search is made easier by the fact that the RNTI defines a limited search space for each UE, so that the UE need not perform an exhaustive search over all potential combinations of CCE's 216 in the transmission.

Each UE must also search across various Downlink Control Information ("DCI") formats, which correspond to different packet lengths, message types, and structures that are typically related to the number of antennas and the MIMO type supported by the terminal. For downlink specific DCI formats, the downlink transmission mode ("TM") dictates the DCI formats that the UE must check.

To ensure that each PDCCH scheduling message is accepted only by the intended recipient UE or recipient UE's, the BS 102 assigns a unique Radio Network Temporary Identifier ("RNTI") to each active UE 104, 106 in the cell, and then scrambles the cyclic redundancy check (CRC) for each PDCCH message using the RNTI that has been assigned to the intended recipient. The UE 104 then monitors the PDCCH and performs a descrambling operation on the CRC using its RNTI. If the CRC passes the UE knows that the scheduled information is intended for it.

Note that the LTE standard defines several types of RNTI, including not only RNTI's that are assigned uniquely to individual UE's (e.g. RA-RNTI's and C-RNTI's), but also RNTI's that are assigned to groups of UE's (e.g. P-RNTI's), or even to all the UE's in the cell (e.g. SI-RNTI's). For simplicity, unless otherwise specified, the invention is described herein with reference to RNTI's that are uniquely assigned to UE's, but it should be noted that the invention can be applied to many or all types of RNTI, and that the term "RNTI" is used herein generically to refer to all such types of RNTI.

At any given time there may be many UE's in the cell that are idle. Accordingly, the BS 102 assigns RNTI's to the UE's as they transition from the idle state to the active state through a process called "acquisition." When a UE transitions back to an idle state, the assigned RNTI is released, and may subsequently be assigned to a different UE in the cell 100.

During acquisition 200 an idle UE initiates the acquisition process by sending an authorization request through the "Physical Random Access CHannel ("PRACH") 202. The BS 102 responds by assigning an RNTI to the UE 104. The acquisition process then proceeds through an exchange of messages that are transmitted by the UE on the Physical Uplink Scheduling CHannel ("PUSCH") 204 and by the BS on the Physical Downlink Scheduling CHannel ("PDSCH") 206.

Figure 3:
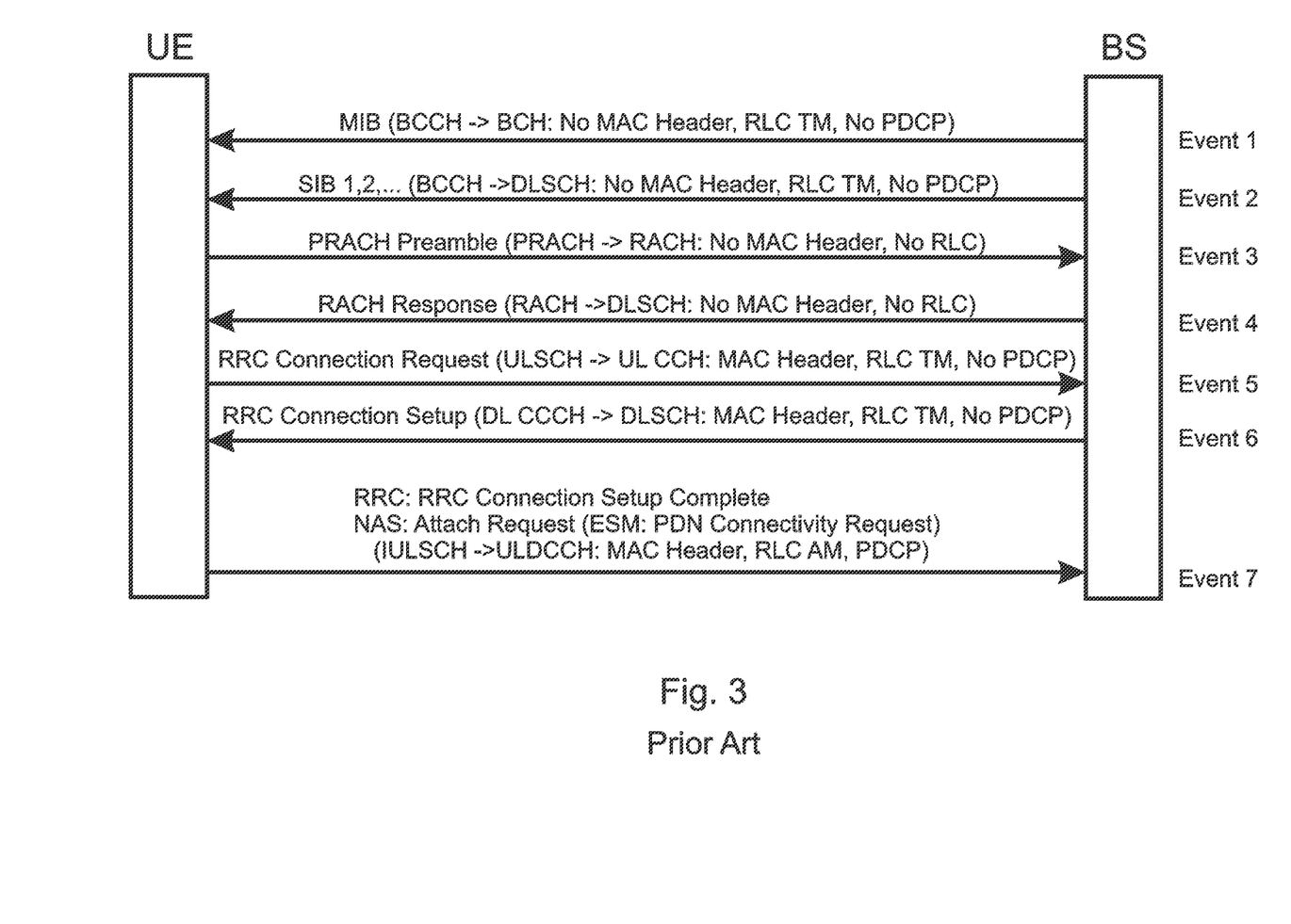
FIG. 3 is a block diagram illustrating the LTE acquisition handshake process in detail.

FIG. 3A presents a somewhat more detailed illustration of the LTE acquisition handshake process in terms of seven "events" that are included in the handshake.

For each possible combination of CCE's in a PDCCH transmission, referred to herein as PDCCH "detections," there will be a corresponding "valid" RNTI. This applies both to actual "correct" messages and to "incorrect" detections that do not represent actual messages. This effect occurs due to the PDCCH CRC being 16 bits, as well as there being 2^16 valid RNTIs, making one RNTI appear to be valid for every possible combination of CCEs. Since only a small subset of the total RNTI's will typically be allocated to UE's, herein referred to as the "active" RNTIs, most of these valid RNTI's will not correspond with any of the RNTI's that have been assigned by the BS to active UE's in the cell. However, it can sometimes happen by chance that a certain combination of CCE's in a PDCCH transmission corresponds with a valid RNTI that has in fact been assigned to an active UE, even though the combination of CCE's is not an actual message. This can cause the UE to falsely attempt to transmit or receiver a message, depending on the contents of the falsely decoded PDCCH message.

It may be desirable under some circumstances to use a device such as a "PDCCH sniffer," to obtain complete scheduling knowledge for a cell by decoding all of the PDCCH messages transmitted by the BS 102. Such a device can be useful for drive testing, network monitoring, and/or debugging, for a network that is either in a lab or fielded. A PDCCH sniffer can also be useful as a parameter receiver which monitors nearby cells in order in improve their performance and/or the performance of some aspect of the network. A parameter receiver may be integrated into a UE or a base station.

The PDCCH sniffer may perform an exhaustive search over all possible combinations of CCE's in each PDCCH transmission. In general, this will result in many PDCCH "false alarms," where the sniffer has falsely detected that a certain PDCCH detection is destined for a UE with a certain RNTI. The false alarm rate will be very high, because each combination of CCE's that is searched will have a valid RNTI that is one of the possible RNTI's, regardless of whether the detection is actually a message. Since the false alarm rate will be so high, the information obtained by the sniffer cannot be relied upon as accurate.

This false alarm problem becomes worse as multiple DCI formats are considered with different packet lengths. The different DCI formats use different message structures and lengths, each format being intended for a different purpose. These multiple formats exacerbate the problem of false alarms, because a sniffer device attempting to obtain complete scheduling knowledge must search each combination of CCI's for each DCI format, unless the sniffer knows the transmission mode of the BS and can thereby narrow the search.

What is needed, therefore, is a method for reducing PDCCH false alarms during analysis of PDCCH transmissions by a sniffer device.

SUMMARY

Accordingly, a method and system are described for reducing PDCCH false alarms during analysis of a PDCCH transmission. The method includes determining and maintaining a list of active RNTI's in the cell, extracting PDCCH detections from the transmission, and comparing the valid RNTI for an extracted PDCCH detection with the active RNTI's on the list.

According to an exemplary embodiment, a method is described of determining scheduling information of a base station in a network operating according to the Long Term Evolution ("LTE") standard. The method includes monitoring transmissions on the Physical Downlink Control CHannel ("PDCCH") of the wireless base station, maintaining a list of active Radio Network Temporary Identifiers ("RNTI's") assigned by the wireless base station to user equipment, extracting PDCCH detections from the monitored transmissions, applying at least one false alarm reduction strategy to eliminate invalid PDCCH detections from the extracted PDCCH detections, said false alarm reduction strategy including determining an RNTI that is valid for an extracted PDCCH detection, and determining if the valid RNTI is included in the list of active RNTI's, and determining scheduling information of the wireless base station from the extracted PDCCH detections.

According to another exemplary embodiment, a system is described for determining scheduling information of a base station in a network operating according to the Long Term Evolution ("LTE") standard. The system includes a sniffing device configured for receiving PDCCH transmissions from a wireless base station in a network operating according to the Long Term Evolution ("LTE") standard, and a controller coupled to the sniffing device. The controller is configured to monitor transmissions on the Physical Downlink Control CHannel ("PDCCH") of the wireless base station, maintain a list of active Radio Network Temporary Identifiers ("RNTI's") assigned by the wireless base station to user equipment, extract PDCCH detections from the monitored transmissions, apply at least one false alarm reduction strategy to eliminate invalid PDCCH detections from the extracted PDCCH detections, said false alarm reduction strategy including determining an RNTI that is valid for an extracted PDCCH detection, and determining if the valid RNTI is included in the list of active RNTI's, and determine scheduling information of the wireless base station from the extracted PDCCH detections.

According to yet another exemplary embodiment, a non-transitory computer-readable medium storing a computer program is described, the computer program being executable by a machine for operating a sniffing device configured for receiving PDCCH transmissions from a wireless base station in a network operating according to the Long Term Evolution ("LTE") standard. The computer program includes executable instructions for, monitoring transmissions on the Physical Downlink Control CHannel ("PDCCH") of the wireless base station, maintaining a list of active Radio Network Temporary Identifiers ("RNTI's") assigned by the wireless base station to user equipment, extracting PDCCH detections from the monitored transmissions, applying at least one false alarm reduction strategy to eliminate invalid PDCCH detections from the extracted PDCCH detections, said false alarm reduction strategy including determining an RNTI that is valid for an extracted PDCCH detection, and determining if the valid RNTI is included in the list of active RNTI's, and determining scheduling information of the wireless base station from the extracted PDCCH detections.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Figure 4:
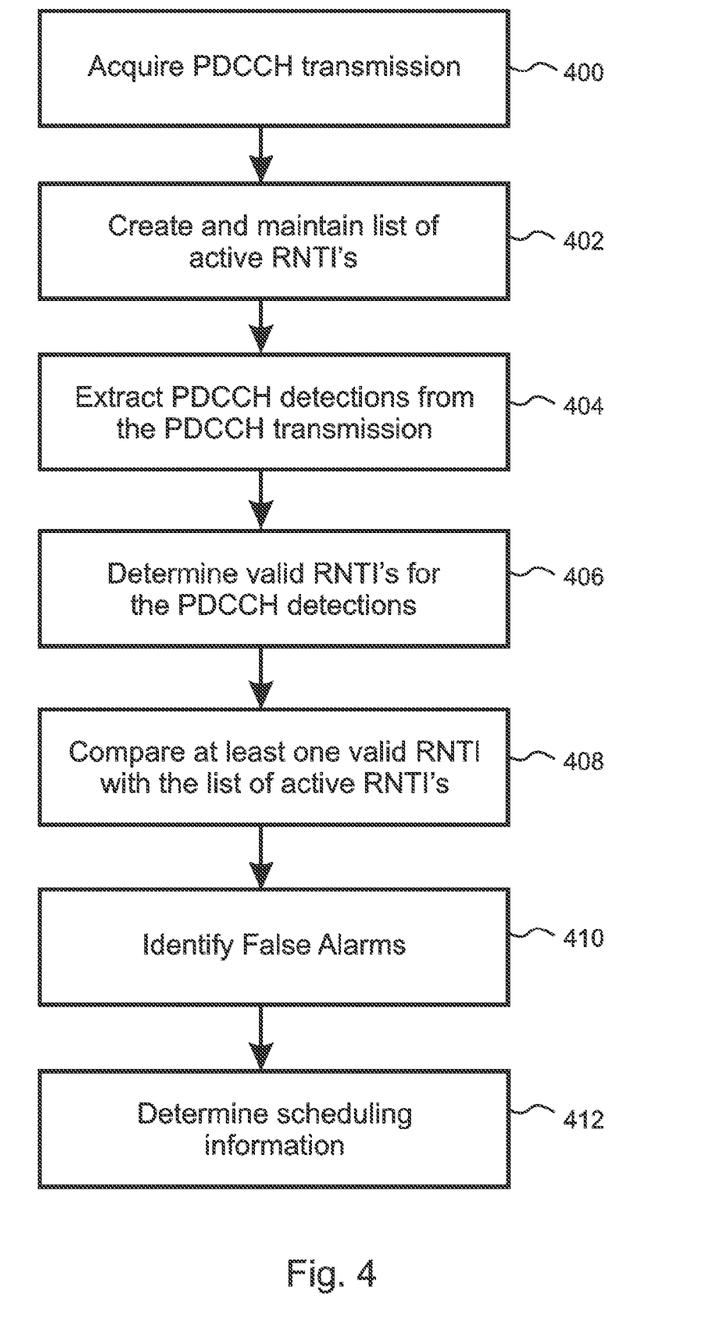
FIG. 4 is a flow diagram illustrating an exemplary embodiment.

A method and system are described for reducing PDCCH false alarms during analysis of a PDCCH transmission. With reference to FIG. 4, the method includes acquiring a PDCCH transmission 400, determining and maintaining a list of active RNTI's in the cell 402, extracting PDCCH detections from the transmission 404, determining the valid RNTI's for the extracted detections 406, at least one false alarm reduction strategy to eliminate invalid PDCCH detections from the extracted PDCCH detections, said false alarm reduction strategy including determining if at least one of the valid RNTI's is included in the list of active RNTI's 408, 410, and determining scheduling information for the cell from the PDCCH detections that are not false alarms 412.

The only UEs that will have active RNTIs will be the ones that are in the RRC_CONNECTED state, because they are about to, or have recently, transmitted or received data. It is a core LTE assumption that a cell will only assign a small fraction of the available RNTI's, so that a cell operating according to the LTE protocol has a reasonable false alarm rate. If all 65536 RNTI's were actually assigned to active UE's in a cell, the number of the false alarms of the UEs would equal that of a PDCCH sniffer performing an exhaustive PDCCH search without any false alarm reduction. Similarly, if a PDCCH sniffer were to perform a PDCCH search and retain only those detections for which the valid RNTI was among the subset of RNTIs assigned to the RRC_CONNECTED devices, then the search would include the same number of false alarms as the total number of UE false alarms, which can be assumed to be within a reasonable range.

Therefore, maintaining an accurate and updated list of RNTI's assigned to active UE's, herein referred to as "active" RNTI's, can provide a powerful mechanism for reducing the PDCCH false alarms to an acceptable level. Note that the active RNTI list does not need to be completely accurate to achieve an acceptable PDCCH false alarm rate.

Embodiments follow any of at least three approaches for enabling a PDCCH sniffer to establish and maintain an accurate list of RNTI's. One approach is information sharing, whereby the list of active RNTI's is directly provided to the sniffer, either through a back channel or directly over the LTE link by another node in the network, such as a base station, a controller in the network, or some other node that has better monitoring capability than the PDCCH sniffer.

Another approach for enabling a PDCCH sniffer to establish and maintain an accurate list of active RNTI's is for the sniffer to monitor the exchanges of acquisition messages that control the transitioning of UE's from an idle state to a connected state. During acquisition, the base station and UE execute an extensive handshake procedure, illustrated in FIG. 3, during which the base station assigns at least one RNTI to the UE. An acquisition occurs whenever a user transitions from the RRC_IDLE state to the RRC_CONNECTED state, either because the UE wants to transmit information, or because there is data to be received through the network. This acquisition handshake procedure provides multiple opportunities for a sniffer to determine the active RNTI for the newly acquired UE, so that it can add the new active RNTI to the list of active RNTI's.

One challenge in some cases is when only the uplink or only downlink channels can be monitored during acquisition, thereby requiring that some information be inferred regarding the channels that are not monitored.

With reference to FIG. 3, opportunities for acquisition monitoring are provided for example by Event 4 of the acquisition handshake process, which is transmitted with a random access RNTI ("RA-RNTI") and contains instructions for the UE that include the temporary RNTI (TC-RNTI) for the UE, which becomes the more permanent RNTI (C-RNTI) as long as there are no issues in the rest of the process. The acquisition handshake process will include many additional messages using the PUSCH and PDSCH channels in a short period of time as the TC-RNTI is transitioned to the more permanent C-RNTI. This means that a detected TC-RNTI is reasonably likely to be real if it is utilized often during the acquisition handshake. Additionally, it can be assumed that the frequently used TC-RNTI detected within the handshake messages will soon be an active C-RNTI, and so should be added to the list of active RNTI's.

Still another approach for enabling a PDCCH sniffer to establish and maintain an accurate list of active RNTI's and/or to detect PDCCH false alarms is pattern detection, whereby patterns of the PDCCH detections are monitored and utilized to identify correct detections.

Approaches to pattern detection used in various embodiments are referred to herein as "PDSCH verification," "PDCCH info," "PDCCH patterns," "PDCCH RNTI occurrences," "RNTI allocation strategies," and "RRC content." These approaches are described below.

PDSCH verification: According to this approach, embodiments use information derived from the Physical Downlink Shared Channel (PDSCH) to verify whether a PDCCH detection is correct or not. For example, when a PDCCH transmission contains a downlink scheduling message, a corresponding PDSCH packet occurs in the same subframe, and decoding metrics of this PDSCH packet can be used to verify the correctness of the corresponding PDCCH detection, where the term "decoding metrics" refers to any information that can be derived from receiver signal processing that gives an indication as to whether the scheduling parameters from the PDCCH are correct. Another possibility is to identify the active resource blocks for the PDSCH messages through energy detection or similar method, and determine individual PDCCH detections or combinations of PDCCH detections that are valid for the active resource blocks.

Once a PDCCH detection is determined to be correct, the corresponding valid RNTI can then be compared with the list of active RNTI's, and added to that list if it is not already there. Note that since the RNTI is an identifier for the UE, the same RNTI is used for both uplink and downlink scheduling. As an example, PDCCH info: According to this approach, embodiments detect false alarms based on information contained within the PDCCH detections themselves. For example, it may be known that some DCI formats and/or features are not allowed, due to a network restriction and/or to a requirement of the LTE release that has been implemented. For example some base stations may not support DCI format 1C, format 3, and format 3A. Accordingly, the apparent use of an excluded DCI format in a PDCCH detection can indicate a false alarm. Other information in the PDCCH detection that may be sufficient to detect a false alarm includes an apparent use of a modulation and coding option that is invalid, and/or the apparent presence of frequency hopping for a network that is known not to use frequency hopping.

In this regard, it can be helpful to know the transmission mode that is being used by the UE, as determined during acquisition of the UE by the base station. If the TM mode of a UE is known, then it is also known which DCI formats are allowed for that UE, since each DCI format can be used only for some specific TM's. For example, DCI format 1 can be used only for a TM of 1, 2, or 7, and DCI format 2A can be used only for a TM of 3. In contrast, DCI format 1A can be used for all nine TM's.

PDCCH patterns: According to this approach, embodiments detect false alarms by comparing PDCCH detections with each other, and detecting patterns of content change. For example, if the MCS_Index appears to change drastically from one detection to the next detection, this could indicate a false alarm. Apparent use of different DCI formats can also provide a pattern for detecting false alarms. Even if the TM of a UE is not known, it is still often possible to narrow the range of possible TM's for a given UE, and therefore a given active RNTI, according to the pattern of DCI formats for that RNTI that are found in the PDCCH detections. Then, in embodiments, if a PDCCH detection makes it appear as if a UE has suddenly changed its DCI format in a way that is not possible for any of the TM's that are consistent with the history of the UE's DCI formats, the PDCCH detection is considered to likely be a false alarm.

PDCCH RNTI occurrences: According to this approach, embodiments detect false alarms by considering how many times an RNTI appears as a valid RNTI for PDCCH detections. Typically, most active RNTI's will recur frequently, because most data transmissions typically require sending more than one packet in a short time span. In some of these embodiments, an RNTI is only added to the list of active RNTIs after it is found to be a valid RNTI in a plurality of PDCCH detections.

RNTI allocation strategies: According to this approach, the allocation strategies used by the BS to assign the RNTI's to the UE's is either known or determined. These allocation strategies can then be used to determine if an RNTI is valid. For example, if the BS is allocating RNTIs to users sequentially, and if an RNTI is identified that is far outside of the sequence of known active RNTI's, it can be identified as a false alarm.

RRC content: According to this approach, embodiments detect false alarms by considering information included in RRC messages. For example, RRC_Connection Release is used to free the RNTI of a user and transition the user to the idle mode. Accordingly, if an RRC_Connection_Release is detected, then the corresponding, formerly active RNTI can be removed from the list of active RNTI's.

It can sometimes happen that none of the techniques described above is sufficient by itself to compile and maintain an accurate list of active RNTI's, and hence reduce the PDCCH false alarm rate to an acceptable level. This can occur for many reasons, such as:

Information Sharing is unavailable, unreliable or too slow
  Acquisition Monitoring is unreliable because of SINR issues, or because the complete acquisition handshake cannot be observed due to its inclusion of both uplink and downlink messages
  It is not known when an active UE transitions to the IDLE state
  Pattern Detection is unreliable, and may not be sophisticated enough by itself to determine the RNTIs In such cases, embodiments combine several of the techniques described above. For example, if information sharing is unavailable, acquisition monitoring is unreliable, and transitioning of a UE to the IDLE state cannot be detected, then some embodiments use pattern detection to enhance acquisition monitoring. In some of these embodiments, acquisition monitoring is used to form a list of active RNTI's, but the list is assumed not to be exhaustive. Pattern detection is then used to search for patterns that can be used to determine if other RNTI's should be added to the list of active RNTI's. The detected patterns can include the number of detections of a valid RNTI, the elimination of false PDCCH detections by recognizing erroneous data within the PDCCH detections, and verification of RNTI's by monitoring the Physical Downlink Shared Channel data when available. In certain of these embodiments, an active RNTI is assumed to have become inactive if it is not found to be a valid RNTI for a PDCCH detections during a specified time period.

Embodiments further include at least one network restriction, whereby algorithms that control the base station cause parameters to be assigned in a way that makes it easier to determine false alarms. In some embodiments, the network restriction requires that the RNTI's be allocated in a certain pattern, such as incrementally increasing from a known starting number. For example, if it is known that a base station is required to allocate RNTI's sequentially, starting from 1000, and if there are three active UE's in the cell to which the RNTI's 1000, 1001, and 1002 have been assigned, and if the PDCCH sniffer extracts PDCCH detections having valid RNTI's of 1002, 10630 and 57038, then it can be reasonably assumed that only the PDCCH detection having 1002 as its valid RNTI is correct, while the other two detections are false alarms. In certain embodiments, the base station is required to reassign an RNTI released by a UE that has returned to idle mode to the next user that transitions to the RRC_CONNECTED state. For the example given above, when the UE to which RNTI 1001 has been assigned returns to the RRC_IDLE state, then the next UE that transitions to the RRC_CONNECTED state will be assigned RNTI 1001.

Another example of a network restriction that can make it easier to determine false alarms is a restriction that limits the scheduling options that may be included within a PDCCH message, where a scheduling option is anything that can occur within the PDCCH message. For example, certain modulation and coding options can be prohibited, or frequency hopping may not be allowed.

Figure 5:
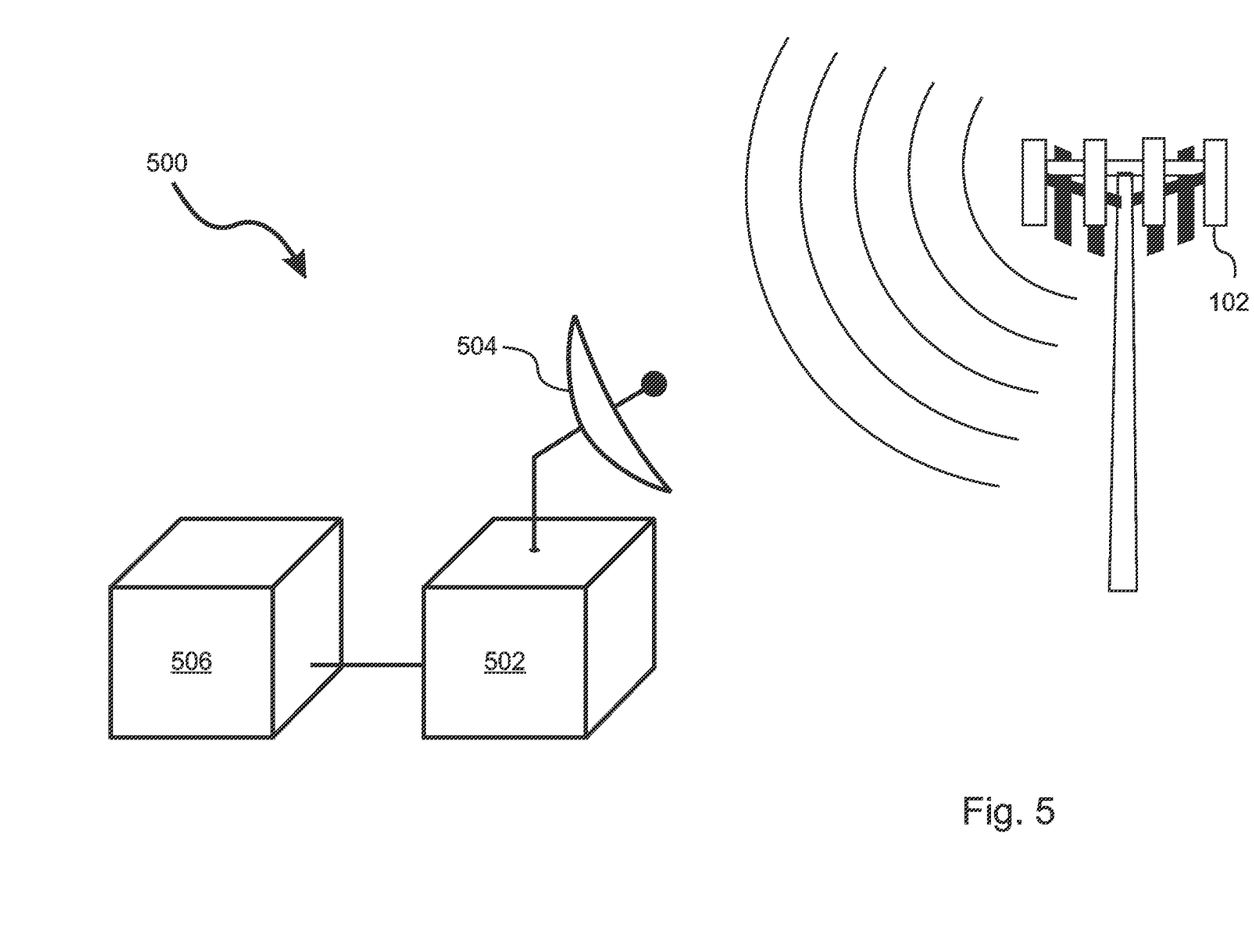
FIG. 5 is a simplified perspective view of a PDCCH sniffing device.

FIG. 5 is a perspective view of a PDCCH sniffer embodiment 500. The sniffer 500 includes a receiver 502 having a PDCCH detection antenna 504, and a control unit 506 that causes the sniffer to implement at least some of the approaches described above.

The controller 506 is an instruction execution machine, apparatus, or device and may comprise one or more of a microprocessor, a digital signal processor, a graphics processing unit, an application specific integrated circuit (ASIC), a field programmable gate array (FPGA), and the like. The controller 506 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The controller 506 and receiver 502 preferably detect and analyze transmissions from a BS 102 that operates in a networked environment using logical connections to one or more remote nodes (not shown). The remote node may be another BS, a UE, a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

It should be understood that the arrangement illustrated in FIG. 5 is but one possible implementation, and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 500. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of determining scheduling information of a base station in a network operating according to the Long Term Evolution ("LTE") standard, the method comprising:
monitoring transmissions on the Physical Downlink Control CHannel ("PDCCH") of the wireless base station;
maintaining a list of active Radio Network Temporary Identifiers ("RNTI's") assigned by the wireless base station to user equipment;
extracting PDCCH detections from the monitored transmissions;
applying at least one false alarm reduction strategy to eliminate invalid PDCCH detections from the extracted PDCCH detections, said false alarm reduction strategy including determining an RNTI that is valid for an extracted PDCCH detection, determining if the valid RNTI is included in the list of active RNTI's, and comparing PDCCH detections with each other to determine whether a PDCCH detection is invalid based on an apparent parameter change between compared PDCCH detections; and
determining scheduling information of the wireless base station from the extracted PDCCH detections.

2. The method of claim 1, wherein maintaining a list of active RNTI's includes obtaining information regarding active RNTI's from a secondary source.

3. The method of claim 2, wherein the secondary source is the wireless base station, an adjacent cell, a controller in the network, or a node in the network that is distinct from the wireless base station.

4. The method of claim 1, wherein maintaining a list of active RNTI's includes monitoring acquisition messages exchanged between the wireless base station and the user equipment that assign RNTI's to user equipment and control transitioning of the user equipment from an idle state to an active state.

5. The method of claim 4, wherein only downlink acquisition messages are monitored, or only uplink acquisition messages are monitored.

6. The method of claim 1, further comprising:
monitoring the Physical Downlink Shared CHannel ("PDSCH") of the wireless base station;
using information derived from the PDSCH to verify if a PDCCH detection is a valid PDCCH detection; and
if the PDCCH detection is a valid PDCCH detection, adding the RNTI that is valid for the PDCCH detection to the list of active RNTI's.

7. The method of claim 6, further comprising obtaining decoding metrics from at least one PDSCH packet detected on the PDSCH, and using the decoding metrics to determine if a corresponding PDCCH detection is a valid PDCCH detection.

8. The method of claim 6, further comprising identifying which resource blocks are active for the PDSCH messages, and determining at least one of individual PDCCH detections and combinations of PDCCH detections that are valid for the resource blocks that are determined to be active.

9. The method of claim 1, wherein the false alarm reduction strategy further includes discarding extracted PDCCH detections that contain information which is inconsistent with at least one known PDCCH requirement.

10. The method of claim 9, wherein the at least one known PDCCH requirement includes at least one of:
a restriction on allowed Downlink Control Information formats;
a restriction on allowed modulation options
a restriction on allowed coding options;
a restriction on frequency hopping; and
a restriction on allowable combinations of download control information formats and transmission modes.

11. The method of claim 1, wherein the apparent parameter change is at least one of:
an apparent change of a modulation scheme that is unlikely to be valid;
an apparent change of a coding scheme that is unlikely to be valid; and
an apparent change in DCI format that is unlikely to be valid.

12. The method of claim 1, wherein maintaining a list of active RNTI's includes discarding a selected RNTI from the list of active RNTI's if, during a specified time interval, no PDCCH detections are extracted for which the selected RNTI is the valid RNTI.

13. The method of claim 1, wherein the at least one false alarm reduction strategy further includes:

determining a pattern of RNTI assignment by the wireless base station; and determining if the RNTI that is valid for the extracted PDCCH detection is consistent with the pattern of RNTI assignment.

14. The method of claim 1, wherein maintaining a list of active RNTI's includes monitoring RRC messages to determine changes in status of active RNTI's.

15. The method of claim 1, further comprising imposing at least one restriction on operating rules of the wireless base station that provides at least one criterion for discriminating between valid PDCCH detections and invalid PDCCH detections.

16. A system comprising:
a sniffing device configured for receiving PDCCH transmissions from a wireless base station in a network operating according to the Long Term Evolution ("LTE") standard; and
a controller coupled to the sniffing device, the controller being configured to:
monitor transmissions on the Physical Downlink Control CHannel ("PDCCH") of the wireless base station;
maintain a list of active Radio Network Temporary Identifiers ("RNTI's") assigned by the wireless base station to user equipment;
extract PDCCH detections from the monitored transmissions;
apply at least one false alarm reduction strategy to eliminate invalid PDCCH detections from the extracted PDCCH detections, said false alarm reduction strategy including determining an RNTI that is valid for an extracted PDCCH detection, determining if the valid RNTI is included in the list of active RNTI's, and comparing PDCCH detections with each other to determine whether a PDCCH detection is invalid based on an apparent parameter change between compared PDCCH detections; and
determine scheduling information of the wireless base station from the extracted PDCCH detections.

17. The system of claim 16, wherein maintaining a list of active RNTI's includes obtaining information regarding active RNTI's from a secondary source.

18. The system of claim 17, wherein the secondary source is the wireless base station, an adjacent cell, a controller in the network, or a node in the network that is distinct from the wireless base station.

19. The system of claim 16, wherein maintaining a list of active RNTI's includes monitoring acquisition messages exchanged between the wireless base station and the user equipment that assign RNTI's to user equipment and control transitioning of the user equipment from an idle state to an active state.

20. The system of claim 19, wherein the controller is configure to monitor only downlink acquisition messages or only uplink acquisition messages.

21. The system of claim 16, wherein the controller is further configured to:
monitor the Physical Downlink Shared CHannel ("PDSCH") of the wireless base station;
use information derived from the PDSCH to verify if a PDCCH detection is a valid PDCCH detection; and
if the PDCCH detection is a valid PDCCH detection, add the RNTI that is valid for the PDCCH detection to the list of active RNTI's.

22. The system of claim 21, wherein the controller is further configured to obtain decoding metrics from at least one PDSCH packet detected on the PDSCH, and use the decoding metrics to determine if a corresponding PDCCH detection is a valid PDCCH detection.

23. The system of claim 21, wherein the controller is further configured to identify which resource blocks are active for the PDSCH messages, and determine at least one of individual PDCCH detections and combinations of PDCCH detections that are valid for the resource blocks that are determined to be active.

24. The system of claim 16, wherein the false alarm reduction strategy further includes discarding extracted PDCCH detections that contain information which is inconsistent with at least one known PDCCH requirement.

25. The system of claim 24, wherein the at least one known PDCCH requirement includes at least one of:
a restriction on allowed Downlink Control Information formats;
a restriction on allowed modulation options
a restriction on allowed coding options;
a restriction on frequency hopping; and
a restriction on allowable combinations of download control information formats and transmission modes.

26. The system of claim 16, wherein the apparent parameter change is at least one of:
an apparent change of a modulation scheme that is unlikely to be valid;
an apparent change of a coding scheme that is unlikely to be valid; and
an apparent change in DCI format that is unlikely to be valid.

27. The system of claim 16, wherein maintaining a list of active RNTI's includes discarding a selected RNTI from the list of active RNTI's if, during a specified time interval, no PDCCH detections are extracted for which the selected RNTI is the valid RNTI.

28. The system of claim 16, wherein the at least one false alarm reduction strategy further includes:
determining a pattern of RNTI assignment by the wireless base station; and
determining if the RNTI that is valid for the extracted PDCCH detection is consistent with the pattern of RNTI assignment.

29. The system of claim 16, wherein maintaining a list of active RNTI's includes monitoring RRC messages to determine changes in status of active RNTI's.

30. The system of claim 16, wherein the controller is further configured to impose at least one restriction on operating rules of the wireless base station that provides at least one criterion for discriminating between valid PDCCH detections and invalid PDCCH detections.

31. A non-transitory computer readable medium storing a computer program, executable by a machine, for operating a sniffing device configured for receiving PDCCH transmissions from a wireless base station in a network operating according to the Long Term Evolution ("LTE") standard, the computer program comprising executable instructions for:
monitoring transmissions on the Physical Downlink Control CHannel ("PDCCH") of the wireless base station;
maintaining a list of active Radio Network Temporary Identifiers ("RNTI's") assigned by the wireless base station to user equipment;
extracting PDCCH detections from the monitored transmissions;
applying at least one false alarm reduction strategy to eliminate invalid PDCCH detections from the extracted PDCCH detections, said false alarm reduction strategy including determining an RNTI that is valid for an extracted PDCCH detection, determining if the valid RNTI is included in the list of active RNTI's, and comparing PDCCH detections with each other to determine whether a PDCCH detection is invalid based on an apparent parameter change between compared PDCCH detections; and determining scheduling information of the wireless base station from the extracted PDCCH detections.

* * * * *